United States Patent
Soubra et al.

(10) Patent No.: US 6,904,052 B1
(45) Date of Patent: Jun. 7, 2005

(54) OPERATING SYSTEM INDEPENDENT METHOD AND APPARATUS FOR TRANSPORTING VOICE-OVER-IP INFORMATION

(75) Inventors: Diya Soubra, Antibes (FR); Jonathan Peace, Plascassier (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/370,792

(22) Filed: Aug. 5, 1999

(51) Int. Cl.⁷ .......................... H04L 12/28; H04L 12/66; H04J 3/22
(52) U.S. Cl. .......................... 370/465; 370/493; 370/494
(58) Field of Search ................................ 370/351–356, 370/401, 465–466, 493–495

(56) References Cited

U.S. PATENT DOCUMENTS

| | | | |
|---|---|---|---|
| 6,320,857 B1 * | 11/2001 | Tonnby et al. .............. | 370/352 |
| 6,483,600 B1 * | 11/2002 | Schuster et al. ........... | 358/1.15 |
| 6,515,996 B1 * | 2/2003 | Tonnby et al. .............. | 370/401 |
| 6,667,972 B1 * | 12/2003 | Foltan et al. ................ | 370/354 |
| 2001/0036171 A1 * | 11/2001 | Tonnyby et al. ............. | 370/352 |
| 2001/0055308 A1 * | 12/2001 | Afrakhteh et al. .......... | 370/401 |

* cited by examiner

*Primary Examiner*—John Pezzlo
*Assistant Examiner*—Saba Tsegaye
(74) *Attorney, Agent, or Firm*—Farjami & Farjami LLP

(57) ABSTRACT

In exemplary embodiments, a dataport in an access server is suitably configured to emulate a modem connection for non-modem calls such as voice calls. Computer applications for administering, for example, voice-over-network services thus communicate with the port via standard modem calls. In accordance with one aspect of the invention, communications between the port hardware and the voice enabled application take place through an encapsulating protocol such as the Point-to-Point-Protocol (PPP) such that the port is addressable and able to receive controls or other instructions from a voice application residing on the access server or from a distributed location.

18 Claims, 4 Drawing Sheets

OPERATING SYSTEM INDEPENDENT METHOD AND APPARATUS FOR TRANSPORTING VOICE-OVER-IP INFORMATION

FIELD OF THE INVENTION

The invention relates generally to methods and apparatus of transporting audio and video data. More particularly, the invention relates to systems for receiving, routing and administering audio and video data in an access server.

BACKGROUND OF THE INVENTION

Over the past several years access servers (also referred to as communication servers or terminal servers) have been used to receive data communications and to route data from remote locations onto networks such as the Internet. For example, Internet Service Providers (ISPs) typically use access servers to administer data communications from ISP subscribers. In such implementations, the ISP typically configures one or more access servers in connection with modems, which are connected to phone lines. ISP customers, who maintain their own computers with modems, establish a connection to the ISP by placing an ordinary telephone call from their home modem to the ISP modem. The ISP modem provides data to the access server, which typically authenticates the user and facilitates a connection from the users PC to the Internet across the modem-to-modem telephone connection. Such systems may also be used to access, for example, corporate intranets or the like.

Recent advances in access server hardware has allowed the access server to support not only modem connections, but also fax, video conference, voice, multimedia, Asynchronous Transfer Mode (ATM), frame relay, and other types of connections. Such systems frequently include data communications processors such as the Any Port Products available from Conexant Systems of Newport Beach, Calif.

It is typically relatively easy to build administration systems for modem connections because many popular operating systems include modem control functionality. The Windows NT operating system available from the Microsoft Corporation of Redmond, Washington, for example, includes the Telephony Application Programming Interface (TAPI), which includes specific interface calls for interacting between computer applications running on the operating system and a modem. Similarly, Linux and other versions of UNIX typically include device drivers or Application Programming Interfaces (APIs) for interacting with-modems. Such functionality is not, however, generally provided for non-modem telephone connections and the like. Thus, it is more difficult to create applications that make use of the voice functionality included with access server hardware, since such functionality is not automatically addressable within the operating system.

One solution to this problem is to incorporate support for voice services within the operating system itself. Incorporating direct operating system support is typically quite difficult, however, because operating systems are generally created by entities other than those who create access servers and access server components. Most conventional operating systems therefore do not support the wide range of access servers and access server components that are available. Moreover, operating system solutions tend to be based upon proprietary protocols, APIs or hardware, and they are frequently slow to react to changes in access servers or access server components.

Another option is to develop a device driver that is unique for the particular access server or access server components utilized. Again, however, this approach provides a proprietary solution that is unique to the particular application or hardware device included. Such systems are slow to incorporate new functionality in operating systems or hardware, and moreover, they do not facilitate direct addressability from the external host. Direct accessibility is particularly desirable in environments with distributed gateways for routing voice and data communications. Hence, with the "gateway decomposition" schemes currently pursued, many systems providers typically require proprietary device drivers or APIs for interacting with particular hardware.

Although voice-over-network solutions such as those described above are presently in existence, numerous problems remain with universal compatibility and external administration. It is therefore desired to create a system for providing voice services over data networks (such as the Internet) that is portable across different operating systems and types of access hardware. It is also desired to create a system that is usable with distributed gateways.

SUMMARY OF THE INVENTION

In accordance with one embodiment of the present invention, a dataport in an access server is suitably configured to emulate a modem connection for non-modem calls such as voice calls. Computer applications for administering, for example,voice-over-network services thus communicate with the port via standard modem calls. In accordance with one aspect of the invention, communications between the port hardware and the voice enabled application take place through an encapsulating protocol such as the Point-to-Point-Protocol (PPP) such that the port is addressable and able to receive controls or other instructions from a voice application residing on the access server or from a distributed location.

BRIEF DESCRIPTION OF THE DRAWING FIGURE

The above and other features and advantages of the present invention are hereinafter described in the following detailed description of illustrative embodiments to be read in conjunction with the accompanying drawing figures, wherein like reference numerals are used to identify the same or similar parts in the similar views, and:

DETAILED DESCRIPTION OF PREFERRED EXEMPLARY EMBODIMENTS

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. Further, it should be noted that the present invention may employ any number of conventional techniques for data transmission, signaling, data processing, network control, application development, and the like. Such general techniques are not described in detail herein.

To simplify the description of the exemplary embodiments, the invention is frequently described as pertaining to a system of providing voice-over network functionality. It will be appreciated, however, that many applications of the present invention could be formulated. For example, the present invention could be used to transport fax data, motion picture data, closed circuit video information, multimedia content, photographic, stereoscopic, holographic or any other form of moving video, still images, data or other information. Similarly, although the invention is frequently described herein as being implemented with TCP/IP communications protocols, it will be readily understood that the invention could also be implemented using IPX, Appletalk, IP-3, OSI or any number of existing or future protocols.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical access server system.

Figure 1:
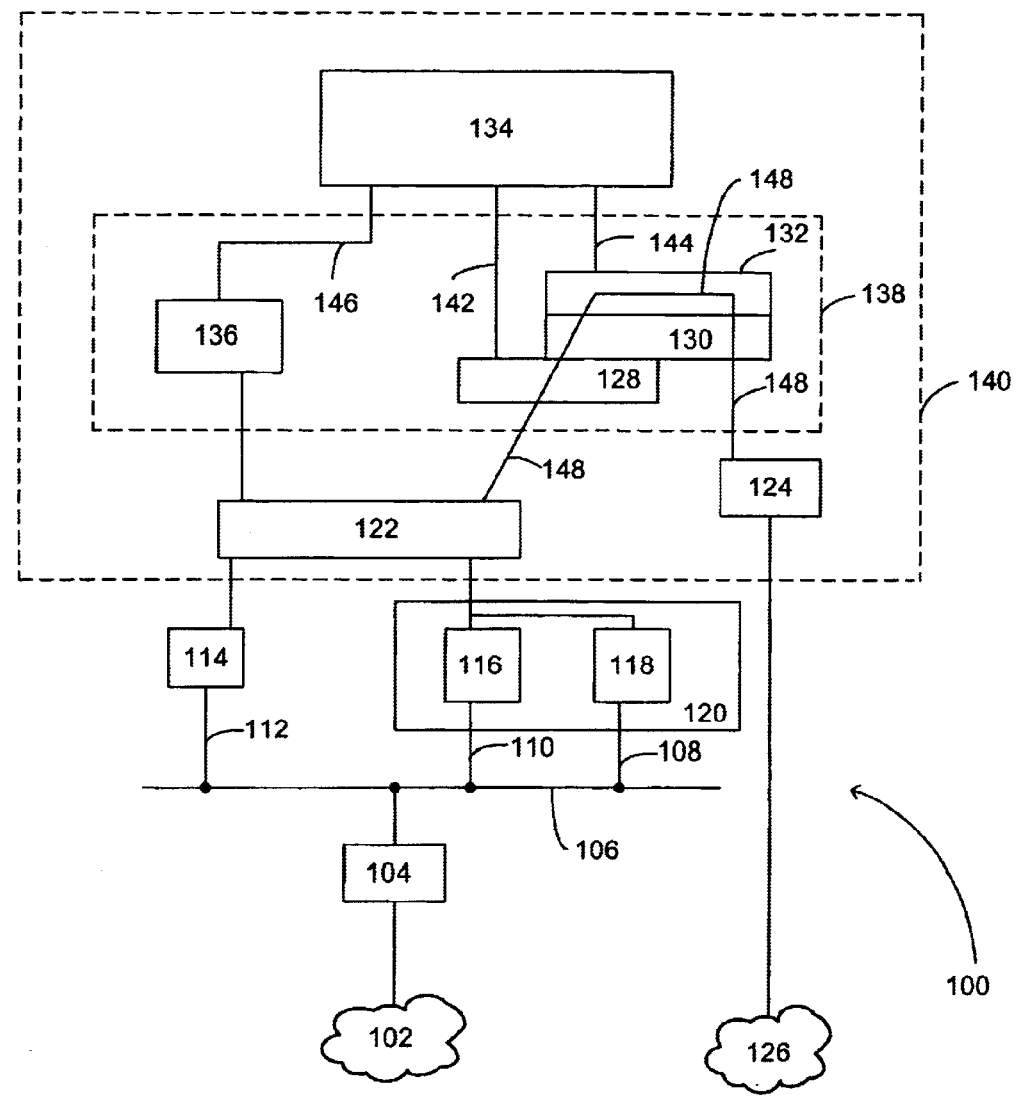
FIG. 1 is a block diagram of an exemplary embodiment of an access server system.

With reference to FIG. 1, an access server system 100 suitable for ISDN or modem communications suitably includes a communications interface 104, access hardware 120, and a computer host 140. The communications interface 104 is any interface device that suitably receives call information from a network 102 such as the public switched telephone network (PSTN) and provides the call information via a bus 106 to an access device. The access device may be implemented, for example, as access hardware 120, as a modem (not shown), or as an ISDN modem 114. In various embodiments of the invention, communications interface 104 is a T1 interface, a modem, or another form of communications service unit (CSU).

Bus 106 is any form of connection device such as an ethernet, token ring, computer bus, or the like that is capable of transferring data from interface 104 to access hardware 120. In various embodiments, bus 106 is a time-division multiplexing (TDM) bus. In such embodiments, various forms of digital data such as high-level data link control (HDLC) protocol information and pulse code modulation (PCM) data are suitably shared by bus 106. In the exemplary embodiment shown in FIG. 1, bus 106 provides HDLC data to ISDN modem 114 and to an ISDN module 118 via interfaces 112 and 108, respectively. Similarly, bus 106 provides PCM data to a modem module 116 via an interface 110.

Access hardware 120 is any device that includes hardware and/or software controls for interfacing and processing data from remote locations. In various embodiments, access hardware 120 includes a semiconductor device such as one or more of the Any Port processors available from Conexant Systems, Inc. of Newport Beach, Calif. Access hardware 120 suitably includes modules for handling various types of data connections. Each module includes programming (such as hardware, software or firmware programming) that implements a particular type of data connection. Modules 116 and 118 in FIG. 1, for example, correspond to modem and ISDN connections, respectively. Of course, it will be recognized that the modules discussed herein are not necessarily physically separate, but rather are logical constructs that aid in understanding. Other modules (not shown) may include voice, asynchronous transfer mode (ATM), frame relay, internet protocol (IP), fax, wireless and the like.

Communications may be suitably controlled by an application program 134 running on host 140. Exemplary computer applications include Remote Access Server (RAS) available from the Microsoft Corporation of Redmond, Wash. or the pppd ("PPP daemon") included with various versions of the LINUX or UNIX operating systems. In such embodiments, application program 134 suitably receives requests for network services, responds to such requests by establishing connections, and assigns a network address (such as an IP address) to the connection established. Some embodiments of application program 134 further provide authentication or other security services. Of course, it will be understood that application program 134 may be any suitable communications server or controller program, and that the particular functionality and implementation of application program 134 will vary from embodiment to embodiment.

Host 140 is any form of computer such as a personal computer, a minicomputer, a mainframe or a specialized computer such as are available from vendors such as Cisco Systems of San Jose, Calif. It will be understood that the invention may be implemented in any form of hardware or software environment. In various exemplary embodiments, host 140 suitably runs an operating system 138 such as Windows 95, 2000, or NT available from the Microsoft Corporation of Redmond, Wash. In alternate embodiments, host 140 runs one of the many versions of the LINUX or UNIX operating systems available from vendors such as Hewlett Packard of Palo Alto, Calif., IBM Corp. of Armonk, N.Y., or Sun Microsystems of Mountain View Calif.

Operating system 138 suitably administers interactions between application program 134 and hardware coupled to host 140. For example, host 140 may include a network interface 124 to a data network 126 such as the Internet, a corporate intranet, or another data network. Similarly, host 140 may include a device driver 122 that handles instructions and data transfers between application program 134 and access hardware 120. Such a device driver is typically related to the particular form of access hardware 120 utilized and will vary from implementation to implementation.

Applications such as application program 134 running on a host frequently interact with device drivers through an intermediate application programming interface (API) 136 that provides a particular type of functionality depending upon the particular device driver. API 136, for example, may be a telephony application interface (TAPI) such as TAPI 2.1 included with Microsoft Windows NT version 4.0. Telephony API 136 suitably implements many common functions required by application program 134 related to telephony such as modem controls, ISDN controls, and the like. To control a modem via application 134, for example, a programmer suitably includes computer instructions in application 134 that interact via interface 146 with telephony API 136 to control device driver 122, which in turn interacts with access hardware 120 and/or ISDN device 114.

Similarly, application program 134 interacts with a network interface 124 via network API 130 such as, for example, the NDIS 4.2 API provided with the Microsoft Windows NT operating system. Various embodiments of the network API 130 suitably include a protocol stack 132 that implements a particular suite of communications protocols such as TCP/IP, IPX, or the like. Applications 134 do not typically interact directly with network interface 124, but rather include calls to network API 130 via interface 144. Network API 130 then suitably formats data packets in accord with a protocol suite 132 and provides the packets to network interface 124 for transmission on network 126.

As described above, application program 134 interacts with access hardware 120 and network interface 124 via device drivers 122 and 124 and via APIs 136 and 130, respectively. An illustrative example will show how the various elements of an exemplary embodiment work together to implement an access server system 100. When a call is received at telephony interface 104, for example, PCM data is suitably transmitted via bus 106 to the access hardware 120. A processor in access hardware 120 recognizes the incoming call as a modem call, for example, and modem module 116 places a request to an administering application (which may be application program 134) to create a modem session with the access server system 100. Modem module 116 sends a request for a new connection via device driver 122, which forwards the request to application program 134 through telephony API 136. The application program 134 receives the request and administers the new session with the access hardware 120, again by sending commands and gathering data via telephony API 136.

In a common access server for use in providing Internet access, for example, application program 134 prompts the user to enter an authorization credential such as a userid/password pair. Authentication information (which is typically in point-to-point protocol (PPP) format) is entered by the user and suitably passed via device driver 122 to a PPP handler 128 associated with network API 130 for authentication. If authentication is successful, application program 134 proceeds to create a virtual connection 148 between module 116 and the network interface 124 such that the remote user is allowed to access network 126. Various embodiments of application program 134 suitably allow multiple connections through access hardware 120, and each connection may be individually addressable through, for example, conventional socket programming techniques. In such embodiments, each connection is represented to application program 134 as an individually-addressable port on access hardware 120, each port having its own network address (such as an IP address). Because application program 134 assigns each port a unique network address, the port itself is addressable by hosts on network 126. Thus, a remote user is provided with direct, addressable access to network 126.

As noted above, exemplary embodiments of telephony API 136 contain adequate controls for interacting with modems and modem modules such as module 116 on access hardware 120. As such, modem connections are relatively easy to implement in access server system 100. Telephony API 136 does not, however, typically contain controls for accessing voice modules in access hardware 120.

Figure 2:
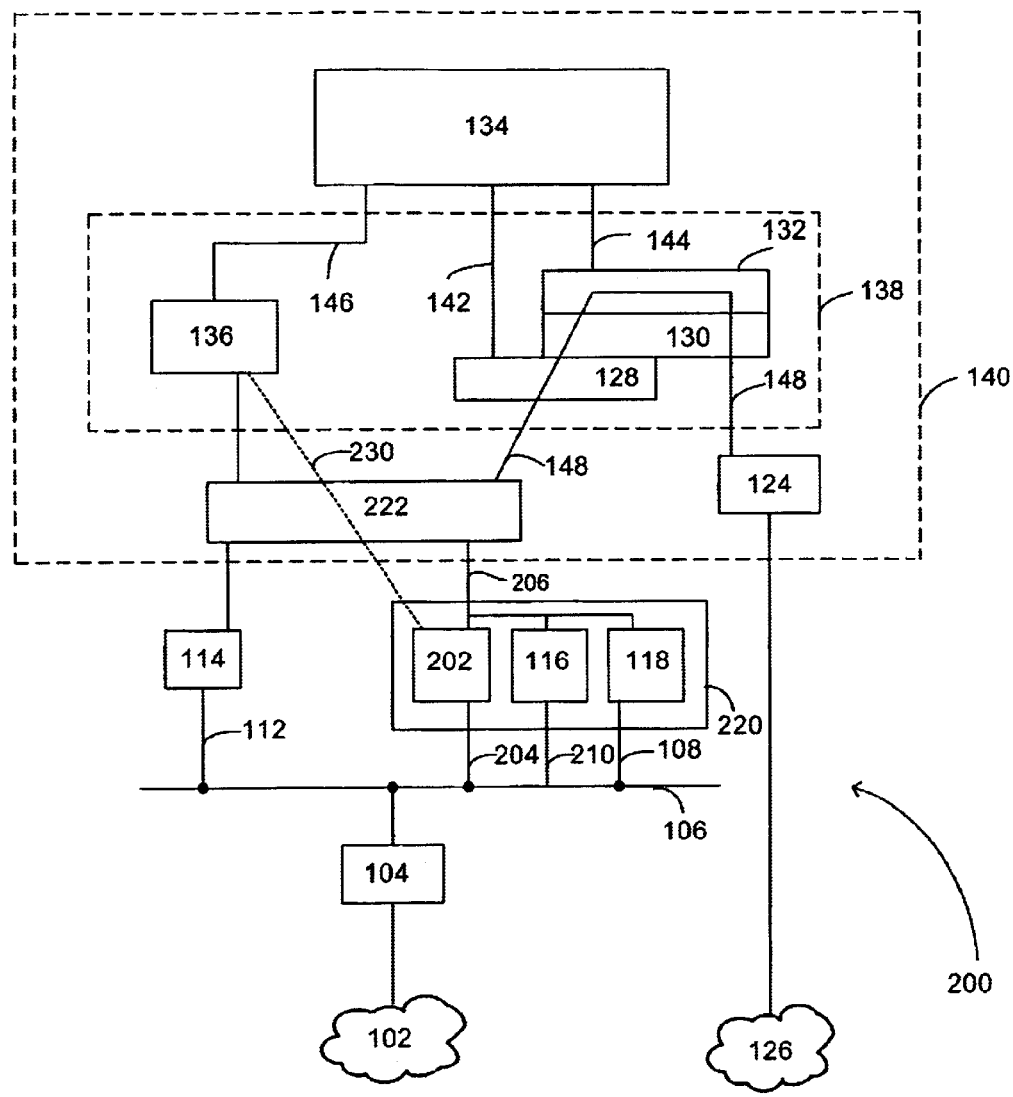
FIG. 2 is a block diagram of a second exemplary embodiment of an access server system.

Referring now to FIG. 2, an access server system 200 for use in administering voice-over-network connections suitably includes access hardware 220 with a voice module 202. As described above, access hardware 220 may be any device that includes hardware and/or software controls for interfacing and processing data from remote locations such as one or more Any Port processors available from Conexant Systems Inc. of Newport Beach, Calif. Access hardware 220 may receive voice, ISDN, modem, and other data calls from interface 104 via bus 106, as described above.

Access hardware 220 communicates with host computer 140 through device driver 222, which is similar to device driver 122 described above but includes added support for voice module 202. Device driver 222 provides an interface between access hardware 220 and host 140 through, for example, conventional interface techniques. Although FIG. 2 shows device driver 222 as part of host 140, it should be noted that device driver 222 functionality may be suitably implemented as software on host 140 or in hardware, software or firmware of access hardware 220. Alternatively, device driver 222 can be implemented as any combination of hardware, software and firmware on access hardware 220 and/or host 140. Various embodiments of the invention implement device driver 222 as a Windows NT miniport or as a LINUX or UNIX device driver, although of course any suitable hardware or software interface could be used.

In various embodiments of the invention, voice module 202 is represented to host 140 as a modem connection. Various embodiments implement the modem-like connection differently, but exemplary techniques include formulating a modem connection in device driver 222 such that operating system 138 "thinks" that data sessions with voice module 202 are modem connections instead of voice connections. To this end, device driver 222 suitably presents voice module 202 to host 140 as a modem port. In various embodiments of the invention, the modem connection is established by passing an electronic message to telephony API 136 with modem parameters instead of conventional voice parameters. These parameters are dictated by the particular telephony API 136, and vary from implementation to implementation. When a connection is initiated in this manner, telephony API suitably creates a connection with device driver 222 that emulates a virtual modem connection 230 between voice module 202 and telephony API 136.

Because the voice connection is presented to the host as a modem connection, the modem functionality implemented in telephony API 136 may be suitably used to send commands and to retrieve data between voice-enabled application 134 and voice module 202 though virtual connection 230. In various embodiments of the invention, telephony API notifies application program 134 that a modem connection is received, and application program 134 may then create virtual connection 148 between voice module 202 and network interface 124, for example as described above. Connection 148 may be created, for example, through conventional programming techniques utilizing the standard telephony API 136.

With continued reference to FIG. 2, access server system 200 suitably administers voice calls by providing a convenient interface between application program 134 and voice module 202 such that voice data is effectively transported to network 126. When voice service is initiated (for example at startup, or as directed by application program 134, or in response to a voice call received from network 102), module 202 establishes a virtual modem connection 230 through device driver 222 and operating system 138 to application program 134. Because the virtual connection 230 acts as a modem connection, application program 134 communicates to device driver 222 through conventional telephony API calls. These calls are suitably addressed to driver 222, which converts instructions and data to a format that is understood by module 202 as necessary. In this manner, application program 134 suitably interacts via telephony API 136 and network API 130 to create virtual connection 148 between access hardware 220 and network 126 using, for example, techniques similar to those employed to create the virtual modem connections described above. In various embodiments, application program 134 assigns a network address (such as an IP address) to the connection such that virtual connection 148 (and thus the port on access server 220 corresponding to voice module 202) is addressable by entities on network 126. With the virtual connection established, voice communications are suitably routed between server 220 and network 126. Thus, a standard computer application 134 such as RAS or pppd can be used in conjunction with a standard telephony API 136 to implement an access server system 200 that provides voice functionality.

In various embodiments of the invention, voice module 202 suitably encapsulates voice data into a protocol frame such as a PPP header that can be transmitted to a local or remote server. Alternatively, commands from a local or remote server may be suitably encapsulated in a network frame such as a PPP frame. Voice module 202 suitably extracts command information from the network frame and executes the commands as necessary.

Figure 3:
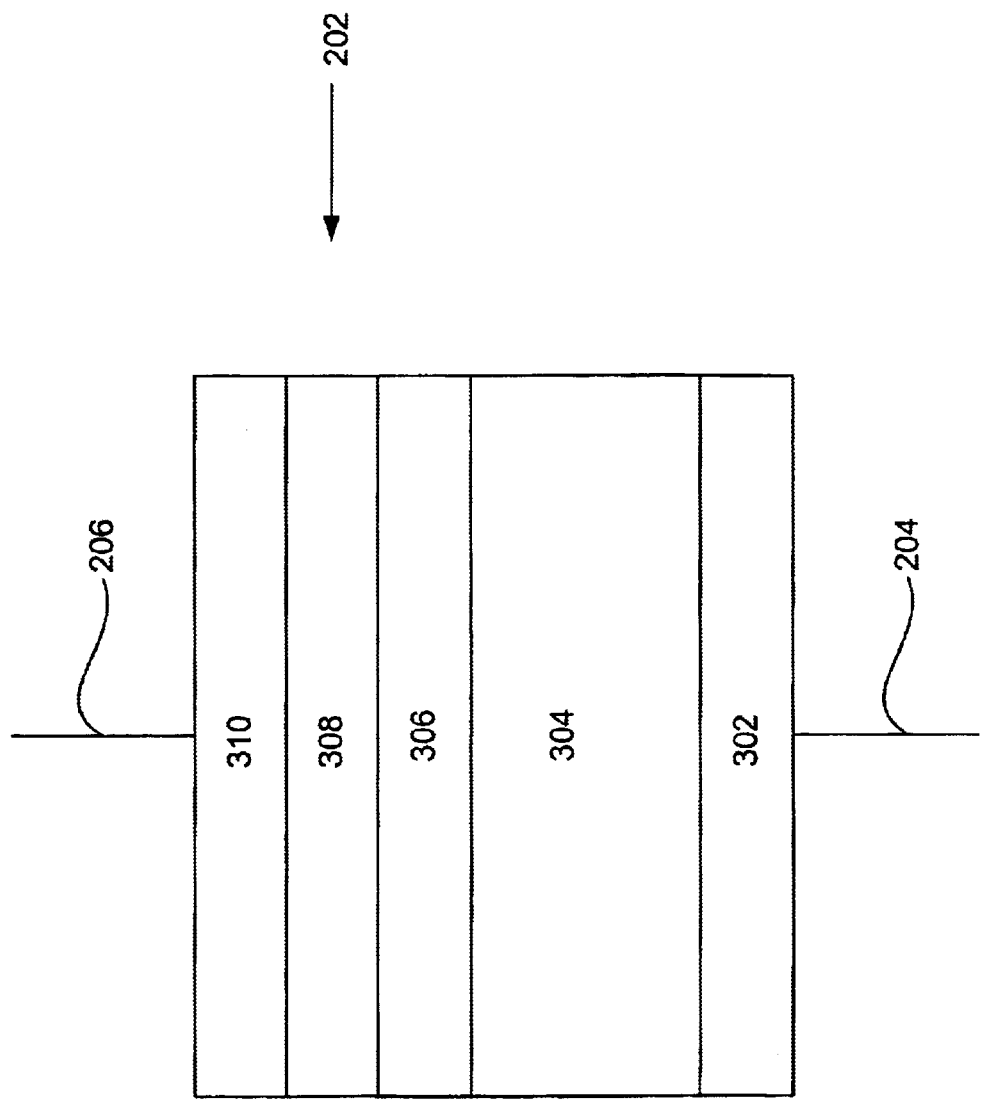
FIG. 3 is a block diagram of an exemplary voice module.

With reference to FIG. 3, an exemplary voice module 202 suitably includes sub-modules for processing voice calls received from connection 204 to bus 106 (not shown in FIG. 3). Each of the sub-modules is a logical construct that illustrates a particular process executed by access hardware 202. Layer 302 receives voice information in, for example, PCM format and decodes the data at a signaling level. As such, layer 302 typically implements protocols such as G.165 and G.168, or any other signaling protocols required. Layer 304 administers any necessary compression or decompression of voice data, for example using the G.723, G.729, G.711 or any other compression routine. Layers 306, 308 and 310 suitably administer the real-time transport protocol (RTP), the user datagram protocol (UDP) and PPP, respectively. RTP layer 306 packages voice samples into a known format as appropriate, and UDP layer 308 suitably encapsulates voice data in a UDP packet that can be transmitted via virtual connection 148, for example, to network 126. In various embodiments, PPP layer 310 suitably encapsulates the voice data in a PPP frame, as described above. Again, alternate embodiments of the invention implement voice data processing in different manners using various protocols. In particular, it is not necessary to include RTP or PPP encapsulation in all embodiments of the invention. Alternatively, the point-to-point to-point tunneling protocol (PPTP) or another protocol could be substituted for PPP or RTP.

Voice data produced at voice module 202 is provided to a destination and suitably processed as required by the particular embodiment. In various embodiments, application program 134 suitably routes voice data to a proper destination on network 126 by embedding the formatted voice data in a network frame such as a TCP/IP frame via network API 130. Various embodiments of application program 134 implement signaling and routing through calls to network API 130. Voice data may be routed directly to a destination on the network, or they may be routed to an administrative server on network 126 that handles routing, billing, etc.

Figure 4:
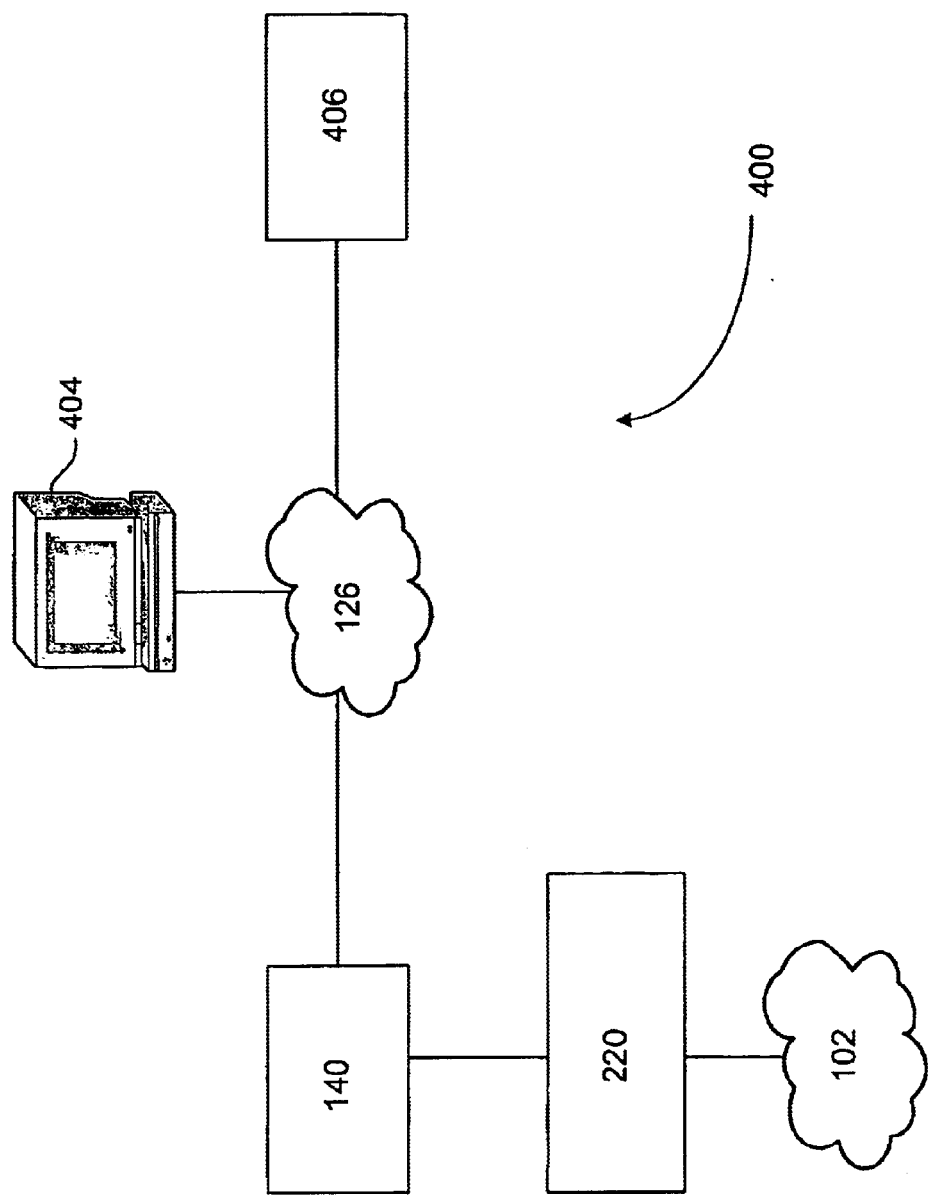
FIG. 4 is a block diagram of an exemplary communications system.

With reference to FIG. 4, a system implementing a so-called "gateway decomposition" scheme includes host 140 communicating with access hardware 220 and with data network 126. Voice calls are received from PSTN network 102 and routed to data network 126 through virtual connection 148 (not shown in FIG. 4) as described above. Server 404 on network 126 suitably interacts with voice module 202 on access hardware 220 via the network address assigned to the virtual connection to transmit voice data to a destination host 406. Server 404 may also provide billing, routing and other functionality as required. Various voice servers 404 such as those available from various manufacturers suitably communicate with voice module 202 via network packets sent through data network 126. In exemplary embodiments the control network packets include commands that are encapsulated in PPP or other network frames, and then sent to host 140 via, for example, conventional TCP/IP addressing and delivery techniques. With momentary reference again to FIG. 2, host 140 receives the control packet on interface 124 and passes the data via network API 130 as directed by application 134 and in accordance with addressing information contained in the control packet. In various embodiments, the control packet includes a reference to a particular address or socket corresponding to virtual connection 148, and the control packet is suitably formatted and provided to voice module 202 as described above. Voice module then extracts the command information from the PPP frame using layer 310 (best shown in FIG. 3) and executes the command. Various commands instruct the voice module to produce a dial tone, hang up the line, provide data to a given destination, and the like. In various embodiments, voice module 202 further includes routing capability for administering multiple incoming voice calls through virtual connection 148. In this manner, many simultaneous voice connections can be produced through a single access hardware unit 220.

The corresponding structures, materials, acts and equivalents of all elements in the claims below are intended to include any structure, material or acts for performing the functions in combination with other claimed elements as specifically claimed. The scope of the invention should be determined by the appended claims and their legal equivalents, rather than by the examples given above.

What is claimed is:

1. A device driver for use with a communication device and an application program, said communication device including a telephone modem module and a voice module, said application program running on an operating system, said operating system including a telephone modem application program interface (API) capable of communicating with said application program using a plurality of telephone modem control calls, instruction calls and data calls, said device driver comprising:

an initiation module configured to receive a voice connection request for establishing a voice connection using said application program;

an establishment module configured to process said voice connection request and, in response to said voice connection request, establish a telephone modem interface for use with said telephone modem API for communicating data related to said plurality of telephone modem control calls, instruction calls and data calls, and establish a voice interface for use with said voice module; and an interaction module configured to convert said data received by said interaction module from said application program through said telephone modem API and then through said telephone modem interface to generate converted data for use by said voice module, and configured to transport said converted data through said voice interface to said voice module;

wherein said device driver establishes said telephone modem interface to represent said voice connection to said application program as a telephone modem connection and facilitates said voice connection using said application program, said application program communicating with said telephone modem interface via said telephone modem API using said plurality of telephone modem control calls, instruction calls and data calls.

2. The device driver of claim 1, wherein said operating system further includes a network API and a network interface, wherein said network interface is in communication with said network API and a network, and wherein said application program establishes a voice connection between said voice module and said network through said device driver, said telephone modem API, said network API and said network interface.

3. The device driver of claim 1, wherein said voice connection request is received from a remote user over a communication interface coupled to said communication device.

4. The device driver of claim 1, wherein said voice connection request is received from said telephone modem API.

5. The device driver of claim 1, wherein said interaction module is further configured to convert data received from said communication device through said voice interface prior to transmission to said telephone modem API through said telephone modem interface.

6. The device driver of claim 1, wherein said converted data includes a plurality of voice control calls, instruction calls and data calls.

7. A method of interfacing a communication device and an application program, said communication device including a modem module and a voice module, said application program running on an operating system, said operating system including a telephone modem application program interface (API) capable of communicating with said application program using a plurality of telephone modem control calls, instruction calls and data calls, said method comprising:

receiving a voice connection request for establishing a voice connection using said application program;

establishing, in response to said voice connection request, a telephone modem interface for use with said telephone modem API for communicating data related to said plurality of telephone modem control calls, instruction calls and data calls, and a voice interface for use with said voice module;

converting said data received from said application program through said telephone modem API and then through said modem interface to generate converted data for use by said voice module; and transporting said converted data through said voice interface to said voice module;

wherein said modem interface represents said voice connection to said application program as a telephone modem connection to facilitate said voice connection using said application program, said application program communicating with said telephone modem interface via said telephone modem API using said plurality of modem control calls, instruction calls and data calls.

8. The method of claim 7, wherein said operating system further includes a network API and a network interface, wherein said network interface is in communication with said network API and a network, and wherein said application program establishes a voice connection between said voice module and said network through said device driver, said telephone modem API, said network API and said network interface.

9. The method of claim 7, wherein said voice connection request is received from a remote user over a communication interface coupled to said communication device.

10. The method of claim 7, wherein said voice connection request is received from said telephone modem API.

11. The method of claim 7 further comprising: converting data received from said communication device through said voice interface prior to transmission to said telephone modem API through said telephone modem interface.

12. The method of claim 7, wherein said converted data includes a plurality of voice control calls, instruction calls and data calls.

13. A communication system comprising:

a communication device including a telephone modem module and a voice module;

an application program running on an operating system, said operating system including a telephone modem application program interface (API) capable of communicating with said application program using a plurality of modem control calls, instruction calls and data calls;

a device driver for use as an interface between said communication device and said application program, said device driver including an initiation module configured to receive a voice connection request for establishing a voice connection using said application program, an establishment module configured to process said voice connection request and, in response to said voice connection request, establish a telephone modem interface for use with said telephone modem API for communicating data related to said plurality of modem control calls, instruction calls and data calls, and establish a voice interface for use with said voice module, and an interaction module configured to convert said data received by said interaction module from said application program through said telephone modem API and then through said telephone modem interface to generate converted data for use by said voice module, and configured to transport said converted data through said voice interface to said voice module;

wherein said telephone modem interface represents said voice connection to said application program as a telephone modem connection to facilitate said voice connection using said application program, said application program communicating with said telephone modem interface via said telephone modem API using said plurality of telephone modem control calls, instruction calls and data calls.

14. The communication system of claim 13, wherein said operating system further includes a network API and a network interface, wherein said network interface is in communication with said network API and a network, and wherein said application program establishes a voice connection between said voice module and said network through said device driver, said telephone modem API, said network API and said network interface.

15. The communication system of claim 13, wherein said voice connection request is received from a remote user over a communication interface coupled to said communication device.

16. The communication system of claim 13, wherein said voice connection request is received from said telephone modem API.

17. The communication system of claim 13, wherein said interaction module is further configured to convert data received from said communication device through said voice interface prior to transmission to said telephone modem API through said telephone modem interface.

18. The communication system of claim 13, wherein said converted data includes a plurality of voice control calls, instruction calls and data calls.

* * * * *